United States Patent
Memory (10) Patent No.: US 7,640,877 B1
(45) Date of Patent: Jan. 5, 2010

(54) DENSE PHASE DISTRIBUTION BRANCH

(75) Inventor: Russell James Memory, Saskatoon (CA)

(73) Assignee: CNH Canada, Ltd., Saskatoon, SK (CA)

( * ) Notice: Subject to any disclaimer, the term of this patent is extended or adjusted under 35 U.S.C. 154(b) by 0 days.

(21) Appl. No.: 12/271,787

(22) Filed: Nov. 14, 2008

(51) Int. Cl.
*A01C 7/00* (2006.01)
*A01C 9/00* (2006.01)
*A01C 15/00* (2006.01)

(52) U.S. Cl. ................. 111/174; 111/200; 111/900

(58) Field of Classification Search ............. 111/174, 111/200, 900
See application file for complete search history.

(56) References Cited

U.S. PATENT DOCUMENTS

| | | | |
|---|---|---|---|
| 0,524,474 A | 8/1894 | Wade | |
| 0,670,534 A | 3/1901 | Carmical | |
| 1,369,649 A | 2/1921 | Gieseler | |
| 2,062,295 A | 12/1936 | Cary et al. | |
| 2,171,205 A | 8/1939 | Zinke | |
| 2,193,738 A | 3/1940 | Perrin | |
| 2,559,183 A | 7/1951 | Barnett | |
| 2,671,690 A | 3/1954 | Von Ehrenkrook | |
| 2,814,531 A | 11/1957 | Murray, Jr. | |
| 2,937,049 A | 5/1960 | Osawa | |
| 3,197,261 A | 7/1965 | Kauffman | |
| 3,207,560 A | 9/1965 | Brown | |
| 3,376,897 A | 4/1968 | Dolder et al. | |
| 3,386,474 A | 6/1968 | Kimmel | |
| 3,387,895 A | 6/1968 | Hochmuth et al. | |
| 3,515,315 A | 6/1970 | Kidd | |
| 3,543,704 A | 12/1970 | Hansen | |
| 3,548,765 A | 12/1970 | Grataloup | |
| 4,036,408 A | 7/1977 | Dugge | |
| 4,082,364 A | 4/1978 | Krambrock | |
| 4,200,412 A | 4/1980 | Steele | |
| 4,244,522 A | 1/1981 | Hartwig | |
| 4,264,243 A | 4/1981 | Bentzen-Bilkvist | |
| 4,280,419 A | 7/1981 | Fischer | |
| 4,379,664 A | 4/1983 | Klein et al. | |
| 4,413,935 A | 11/1983 | Smith et al. | |
| 4,506,704 A | 3/1985 | Boom et al. | |

(Continued)

FOREIGN PATENT DOCUMENTS

BR 9501580-9 A 11/1995

(Continued)

*Primary Examiner*—Christopher J. Novosad
(74) *Attorney, Agent, or Firm*—Rebecca L. Henkel; John William Stader (57) ABSTRACT

A branch for distributing granular material includes an inlet portion, a transition portion downstream of the inlet portion, and an outlet portion downstream of the transition portion. Each portion has a critical air flow rate that is required to cause the granular material to flow through the respective portion. The branching that occurs at the transition portion results in the critical air flow rate of the transition portion being greater than the critical air flow rate of the inlet portion, typically requiring an amount of air at least equal to the critical air flow rate of the transition portion to flow granular material through the branch. In the disclosed branch, the inlet portion is oriented relative to the outlet portion such that applying air to substantially equal the critical air flow rate of the inlet portion results in granular material being urged by gravity to move through the transition portion and into the outlet portion.

13 Claims, 5 Drawing Sheets

U.S. PATENT DOCUMENTS

| | | | |
|---|---|---|---|
| 4,553,882 A | 11/1985 | Knappertz | |
| 4,562,779 A | 1/1986 | Briggs | |
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

DENSE PHASE DISTRIBUTION BRANCH

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to dense phase distribution of granular material, and more particularly, to a dense phase distribution branch configured and oriented to establish and maintain efficient dense phase flow of granular material through the dense phase distribution branch.

BACKGROUND OF THE INVENTION

Many agricultural processes require the delivery of a granular material, such as seed, fertilizer, and the like, from a bulk storage tank toward an outlet or secondary containment system. The granular material is often motivated pneumatically through a series of lines. The flow of granular material through the lines is typically classified as one of two general types, specifically, the granular material may be motivated in a dilute phase flow or in a dense phase flow. During dilute phase flow, the volume percentage of air in the line is much greater relative to the volume percentage of granular material. Alternatively, during dense phase flow the relative ratio is reversed, meaning that a greater volume percentage of granular material is motivated through the line by a lower volume percentage of air.

Dense phase flow provides various benefits. Overall, dense phase flow is more efficient as compared to dilute phase flow because more granular material can be transferred from one location to another with less energy. Moreover, dense phase flow can be generally operated with line velocities under four feet per second and motive pressures below approximately fourteen pounds per square inch gauge. This low velocity/pressure provides smooth, gentle transfer of the granular material through the line thereby reducing damage to the granular material. Also, since near full pressure resides in the lines at startup, starting the dense phase flow occurs quickly when desired. Further, dense phase flow allows for fewer, smaller lines to be used as compared to dilute phase flow (e.g., two 2" diameter dense phase lines can be configured to transport substantially the same rate of granular material as eight 2.5" lines using dilute phase flow). Dense phase flow also provides improved flexibility to deliver product sectionally without the need for bulky, costly, and repetitious equipment (e.g., sectional distribution using dilute phase flow may require multiple metering sections, independent air supplies to create the dilute phase flow, etc.).

Dense phase flow, however, presents a series of challenges, especially when used in the agricultural context. When dense phase flow is incorporated in the agricultural context, the overall dense phase distribution system is limited in capacity by practical considerations (i.e., the amount or volume of air that can be supplied to the system to deliver the granular material from a bulk storage tank to the ultimate application is limited by space, power, and other operating conditions).

The challenges are exacerbated by the inclusion of a branch in the system. A branch diverts the upstream flow of granular material into two or more downstream flows, thereby allowing the granular material to be distributed to multiple outlets or secondary containments (albeit not necessarily simultaneously as a downstream valve can control an end of the line outlet, and therefore conserve the available air). A branch typically results in an increased cross-sectional area and a decrease in the velocity (and momentum) of the granular material through a branch. This decrease in velocity is in addition to the resistance attributable to typical line flow losses and resistance resulting from relative movement between grains of the granular material. Limited pneumatic capacity prevents the "simple" solution of increasing the flow rate of air in the lines to counterbalance the expanded area of the branch. An increased pneumatic flow rate will also reduce some of the benefits of dense phase, such as the smooth, gentle flow of the granular material. As a result, the limited pneumatic capacity and typical branch flow losses of dense phase flow presents challenges to maintain efficient transfer of the granular material through the branch.

In view of at least the preceding considerations, delivery of granular material by dense phase flow through a branch has many unique challenges that are present in the agricultural industry. Therefore, a need exists for a dense phase branch that overcomes the established challenges.

SUMMARY OF THE INVENTION

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,808 ("Pressure Supply Assembly for an Agricultural Implement with Dense Phase Product Flow"); U.S. application Ser. No. 12/271,816 ("Dense Phase Induction System and Method"); and U.S. application Ser. No. 12/271,822 ("Granular Containment Assembly and Method").

In accordance with one aspect of the invention, a branch configurable for use in a dense phase distribution system that distributes a granular material comprises an inlet portion defining an inlet critical air flow rate required to cause the granular material to flow through the inlet portion, a transition portion downstream of the inlet portion defines a transition critical air flow rate required to cause the granular material to flow through the transition portion, and an outlet portion downstream of the transition portion. The transition critical air flow rate is greater than the inlet critical air flow rate. The inlet portion is oriented relative to the outlet portion such that applying an amount of air to the inlet portion substantially equal to the inlet critical air flow rate will result in granular material moving through the transition portion and into the outlet portion.

The outlet portion may define an outlet critical air flow rate required to cause the granular material to flow through the outlet portion, and the inlet critical air flow rate may be substantially equal to the outlet critical air flow rate.

The inlet portion may be substantially circular in an inlet plane normal to a direction of travel of the granular material in the inlet portion, and the outlet portion may be substantially circular in an outlet plane normal to a direction of travel of the granular material in the outlet portion. The inlet portion may define an inlet portion diameter that may be approximately two inches and the outlet portion may define an outlet portion diameter that may be approximately two inches.

The inlet critical air flow rate may be less than approximately three and one-half feet per second.

The branch may further comprise a vertical axis extending normal to a horizontal plane, a transition axis defined by the transition portion along the direction of travel and intersecting the vertical axis, a transition angle defined between the vertical axis and the transition axis, and a transfer angle defined between the vertical axis and an inherent repose surface defined by the granular material. The transition angle is equal to or less than the transfer angle.

According to another aspect of the invention, a branch configurable for use in a dense phase distribution system that distributes a granular material defining a transfer angle between a vertical axis and an inherent repose surface defined by the granular material, comprises an inlet portion defining an inlet critical air flow rate required to cause the granular material to flow through the inlet portion, a transition portion downstream of the inlet portion defining a transition axis along the direction of travel in the transition portion and intersecting the vertical axis, a transition angle defined between the vertical axis and the transition axis, and a transition critical air flow rate required to cause the granular material to flow through the transition portion, and an outlet portion downstream of the transition portion. The transition critical air flow rate is greater than the inlet critical air flow rate. The transition angle is equal to or less than the transfer angle such that a force of gravity urges the granular material from the inlet portion through the transition portion and into the outlet portion.

The outlet portion may define an outlet critical air flow rate required to cause the granular material to flow through the outlet portion and the inlet critical air flow rate may be substantially equal to the outlet critical air flow rate.

The inlet portion may be substantially circular in an inlet plane normal to a direction of travel of the granular material in the inlet portion, and the outlet portion may be substantially circular in an outlet plane normal to a direction of travel of the granular material in the outlet portion. The inlet portion may define an inlet portion diameter that may be approximately two inches and the outlet portion may define an outlet portion diameter that may be approximately two inches.

The inlet critical air flow rate may be less than approximately three and one-half feet per second.

In accordance with yet another aspect of the invention a method of manufacturing a branch for use in a dense phase distribution system that distributes a granular material along a direction of travel, comprises the steps of: arranging an inlet portion that defines an inlet critical air flow rate required to cause the granular material to flow through the inlet portion; arranging a transition portion downstream of the inlet portion that defines a transition critical air flow rate required to cause the granular material to flow through the inlet portion, wherein the transition critical air flow rate is greater than the inlet critical air flow rate; arranging an outlet portion downstream of the transition portion; and orienting the inlet portion relative to the outlet portion such that applying an amount of air to the inlet portion substantially equal to the inlet critical air flow rate will result in granular material moving through the transition portion and into the outlet portion.

The outlet portion may define an outlet critical air flow rate required to cause the granular material to flow through the outlet portion, and the inlet critical air flow rate may be substantially equal to the outlet critical air flow rate.

The foregoing and other aspects of the invention will appear in the detailed description that follows. In the description, reference is made to the accompanying drawings, which illustrate preferred example embodiments of the invention.

DETAILED DESCRIPTION OF THE EXAMPLE EMBODIMENTS

Simplified pictorial and schematic representations of a dense phase distribution system 10 incorporating an aspect of the present invention are shown in FIGS. 1A, 1B, 1C, and 2. The dense phase distribution system 10 is described in the context of the agricultural industry and the distribution of granular material, such as seed and fertilizer; however, the description is not intended to be limiting. As a result, the dense phase distribution system 10 and components disclosed and claimed may be implemented in a variety of industries and contexts to distribute a range of granular materials. For example, the dense phase distribution system 10 may be configured for use in the mining industry to more efficiently move grains of coal.

Figures 1A, 1B:
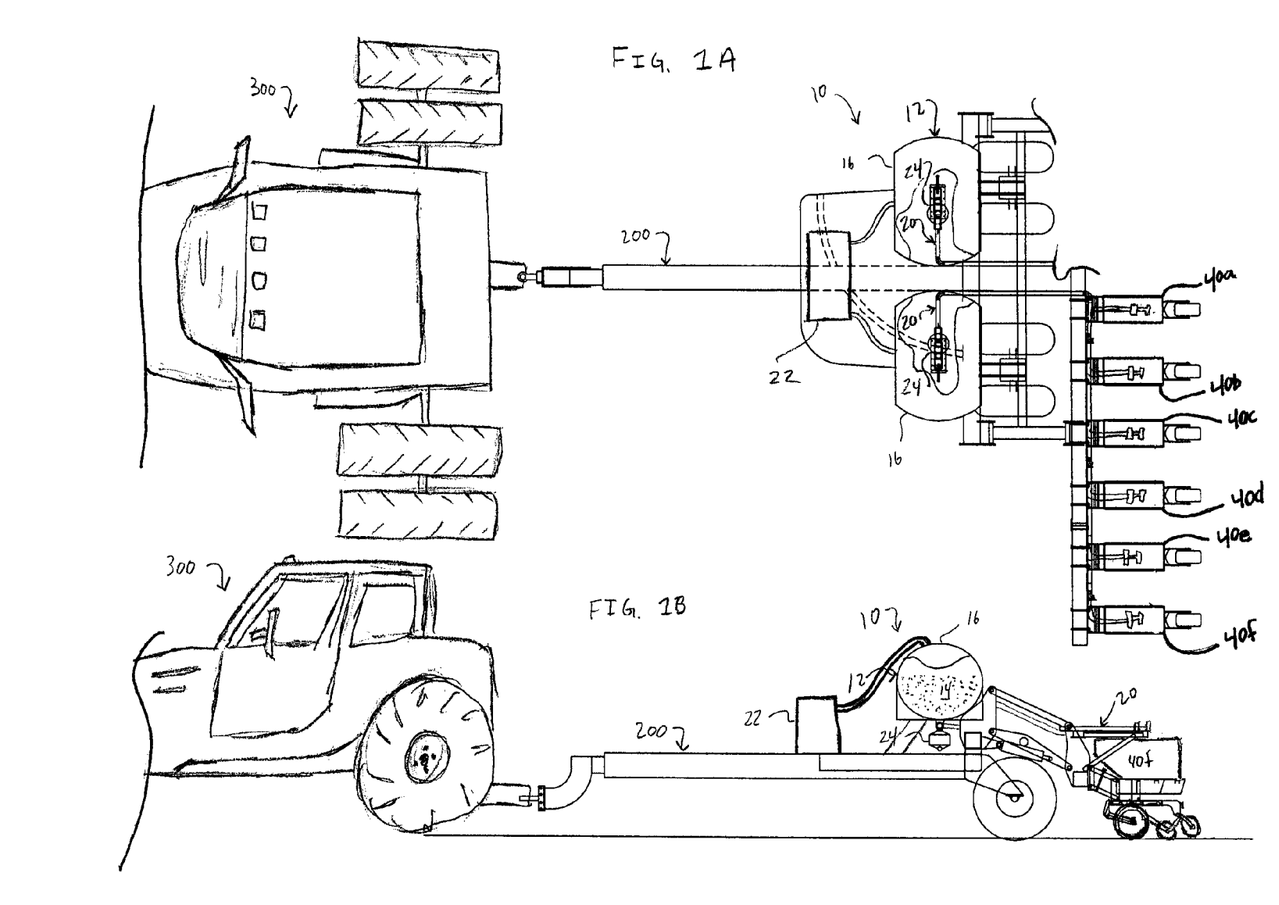
FIG. 1A is a partial top view of a dense phase distribution system used in connection with an agricultural vehicle.
FIG. 1B is a partial side view of the dense phase distribution system and agricultural vehicle of FIG. 1A.
Figure 1C:
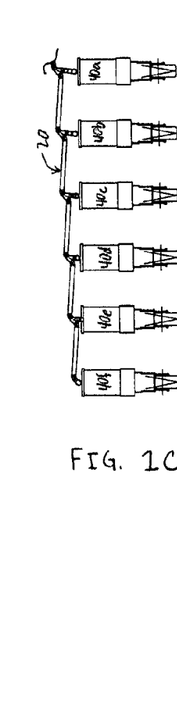
FIG. 1C is a partial end view of the dense phase distribution system of FIG. 1A.

In the example embodiment described in the agricultural context, the various components of the dense phase distribution system 10 are secured to a frame 200 that is coupleable to and pulled behind an agricultural vehicle 300, such as a tractor. As will be appreciated by one skilled in the art, the frame 200 may support components required for planting, seeding, or any other agricultural processes. With continued reference to FIGS. 1A, 1B, 1C, and 2, the dense phase distribution system 10 broadly includes a dense phase supply system 12 for controlling the dense phase flow of a granular material 14. In the example embodiment, the dense phase supply system 12 supplies a granular material 14 (e.g., seed) to a series of secondary containment systems 40*a*, 40*b*, 40*c*, 40*d*, 40*e*, 40*f* (seeders, planters, storage container, and the like) for ultimate distribution to a field. Additional secondary containment systems are shown in FIG. 1A, however for simplicity they are not described in detail as the present disclosure enables one skilled in the art to adapt the invention for use with any number of secondary containment systems. The dense phase distribution system 10 provides a controllable pneumatic pressure differential that can be activated and deactivated to motivate the granular material 14 from a supply container 16 (or a plurality of supply containers 16) downstream toward a supply line inlet 18 of a supply line 20. The supply line 20 is in fluid communication with the dense phase supply system 12 such that the granular material 14 may selectively flow from the supply container 16 into the supply line 20.

In the example embodiment, the dense phase supply system 12 includes a compressor 22 that provides an amount of pneumatic pressure to the supply container 16 (i.e., the pneumatic capacity of the dense phase supply system 12). A valve 24 downstream of the supply container 16 may be used to control the flow of granular material 14 through the supply line 20. One skilled in the art will appreciate the various techniques available to control and modulate the dense phase flow of granular material 14, as well as the various dense phase supply systems that may be incorporated with the invention.

Figure 2:
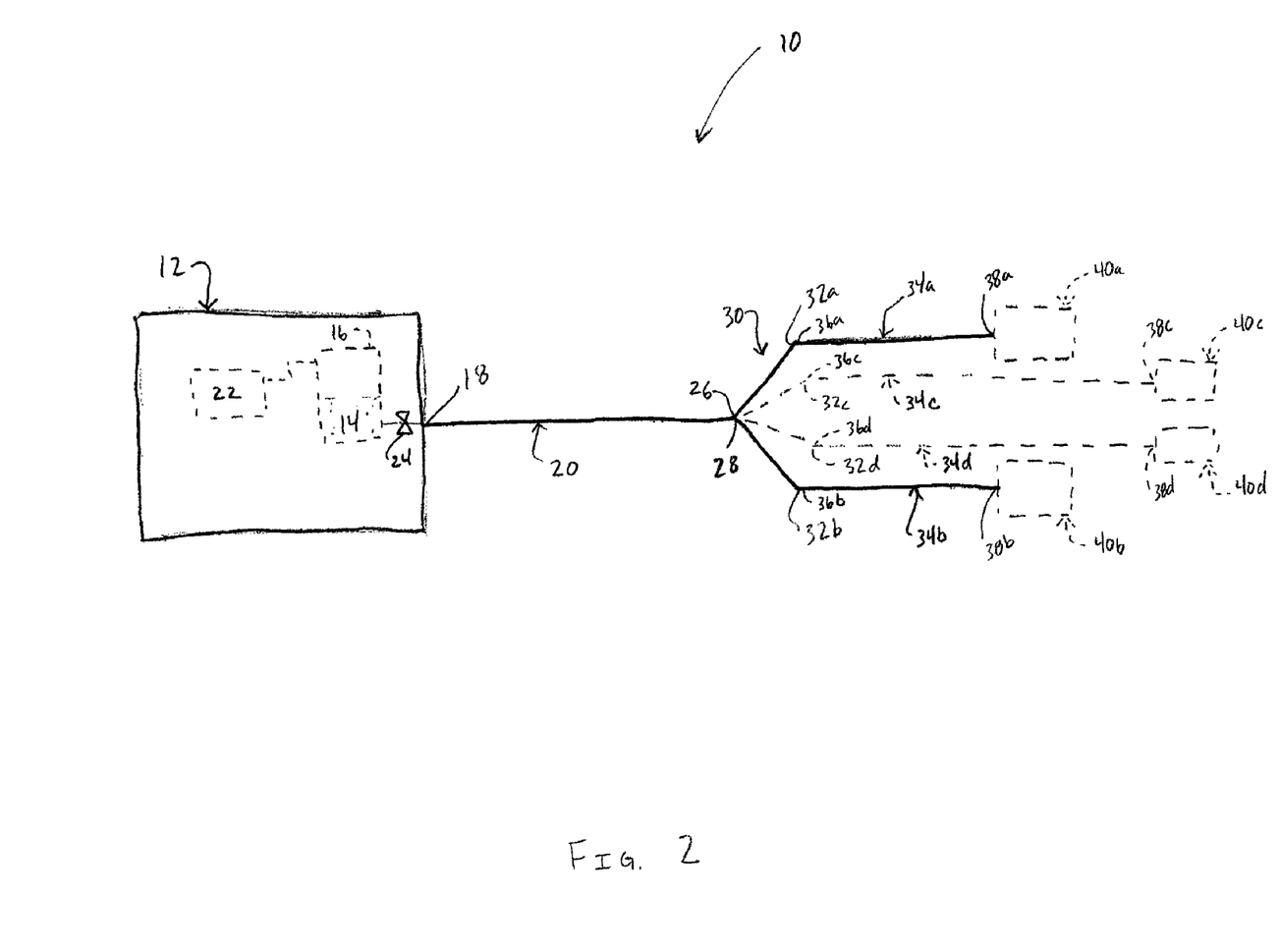
FIG. 2 is a simplified schematic of a dense phase distribution system incorporating an aspect of the invention.

With specific reference to FIG. 2, the general purpose of the dense phase supply system 12 is to distribute bulk granular material 14 from a central supply container 16 to various downstream secondary containment systems 40a, 40b, 40c, 40d (seeders, planters, storage container, and the like). When the dense phase supply system 12 is activated, the granular material 14 is urged to flow by the pneumatic pressure from the supply container 16 downstream to the supply line 20, and from the supply line inlet 18 to a supply line outlet 26. A branch inlet 28 of a branch 30 positioned downstream of the supply line 20 is in fluid communication with the supply line outlet 26 for receiving the granular material 14. The branch 30 diverts the dense phase flow of granular material 14 from the single branch inlet 28 to a plurality of branch outlets 32a, 32b, 32c, 32d downstream of the branch inlet 28. The example embodiment shows a pair of branch outlets 32a, 32b depicted with solid lines, and also includes two additional branch outlets 32c, 32d depicted with dashed lines. The invention contemplates that the branch 30 may include any number of branch outlets 32a, 32b, 32c, 32d to distribute the granular material 14 to a variety of ultimate locations.

In the example embodiment, a plurality of distribution lines 34a, 34b, 34c, 34d are positioned downstream of the respective branch outlets 32a, 32b, 32c, 32d to direct the flowing granular material 14 to the desired locations. Each distribution line 34a, 34b, 34c, 34d includes a distribution line inlet 36a, 36b, 36c, 36d in fluid communication with the respective branch outlets 32a, 32b, 32c, 32d. The granular material 14 flows through the distribution lines 34a, 34b, 34c, 34d from the distribution line inlets 36a, 36b, 36c, 36d to respective downstream distribution line outlets 38a, 38b, 38c, 38d. As noted above, the various distribution line outlets 38a, 38b, 38c, 38d may be configured to engage the respective secondary containment systems 40a, 40b, 40c, 40d. For example, the secondary containment systems 40a, 40b, 40c, 40d may be pressurized seed distribution systems that further distribute the granular material 14 (e.g., fertilizer). Alternatively, the secondary containment systems 40a, 40b, 40c, 40d may be seeders that meter the granular material 14 (e.g., seed) and direct the granular material 14 to the appropriate locations on the planting bed. One skilled in the art will appreciate the multitude of secondary containment systems 40a, 40b, 40c, 40d compatible with the disclosed invention.

As one skilled in the art will appreciate, the cross-section of the supply line 20, the branch 30, and the distribution lines 34a, 34b, 34c, 34d may be of any desired geometry. The preferred embodiment incorporates circular cross-sections to generally aid uniform flow of the granular material 14. Furthermore, the supply line 20, the branch 30, and the distribution lines 34a, 34b, 34c, 34d may be manufactured or formed from a variety of materials and compositions. For example, plastic or metallic construction is preferred to maintain durable, economical construction of the dense phase distribution system 10.

In the typical branch, the flow of granular material 14 through the branch is substantially impeded by the enlargement of the total flow area through the branch, standard flow losses, and the relative movement between grains of the granular material 14 as it flows through the branch. Moreover, due to practical considerations and limitations, the compressor 22 (or other pneumatic source) is limited in its capacity. Therefore, the available air supply cannot simply be increased to account for the increased flow area at the branch 30. The branch 30 disclosed by the invention is oriented and configured such that the granular material 14 is urged by gravity from the branch inlet 28 toward the respective branch outlet 32a, 32b, 32c, 32d, and thus substantially flows from the branch inlet 28 toward the respective branch outlet 32a, 32b, 32c, 32d under the urging of gravity, thus reducing the amount of air required to move the granular material 14 through the branch 30.

Granular material 14 will typically flow through a line due to the urging of gravity if the line is oriented downward at an angle that is steeper than the inherent transfer angle of the granular material 14 (discussed below), for example, a vertically oriented line. The granular material 14 will flow through a line at other angles provided a sufficient amount of air having a sufficient velocity is forced through the line containing the granular material 14. The critical air flow rate is that amount and velocity of air (i.e., mass flow rate) required to cause the granular material 14 to begin to flow in the line—thus initiating dense phase flow. The critical air flow rate is a function of the line (e.g., cross-sectional area, inherent losses, etc.), environmental factors (e.g., relative humidity, ambient temperature, etc.) and the properties of the granular material 14 (e.g., grain size, grain contour, etc.). The mass flow of the granular material 14 will generally increase as the velocity of the air is increased.

The velocity of air moving through any particular section of line will depend in part on the cross-sectional area of the line. In general, given a constant air supply, as the area increases the corresponding velocity will decrease. Alternatively, if the area decreases, the corresponding velocity will increase accordingly. Only when the critical velocity is reached in the largest cross section of the line, oriented at an angle steeper than the transfer angle, will dense phase flow begin to occur throughout the line. A typical branch causes an increase in cross-sectional area that in turn requires an increase in the velocity of the supplied air to motivate the granular material 14 through the enlarged section.

However, because efficiency is important in the agricultural industry given the limited capacity of the air source and because dense phase flow is preferably operated below approximately fourteen pounds per square inch, the motivating air pressure cannot simply be increased to account for the enlarged area in the branch 30.

Figure 3:
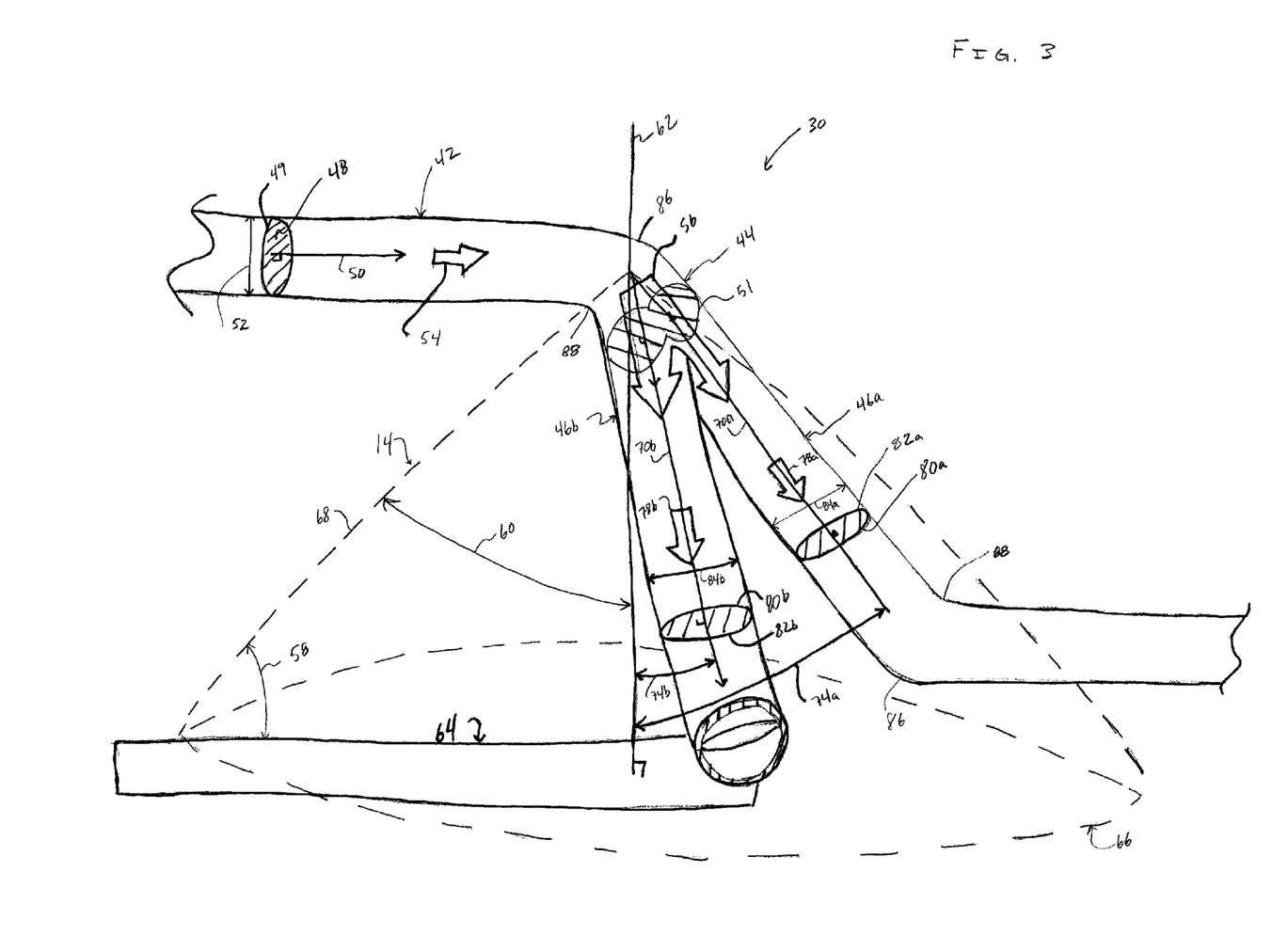
FIG. 3 is a partial perspective view of a branch in accordance with an aspect of the invention.

With additional reference to FIG. 3, an exemplary branch 30 is shown. The branch 30 includes an inlet portion 42 upstream of a transition portion 44. A pair of outlet portions 46a, 46b are downstream of the transition portion 44. As noted, the branch 30 may include multiple outlet portions 46a, 46b and remain within the scope of the present invention. Moreover, any of the outlet portions 46a, 46b may alternatively lead to another inlet portion (not shown) of a downstream branch (not shown).

The inlet portion 42 preferably has a substantially circular cross section in an inlet plane 48 defined normal to a direction of travel 50 of the granular material 14 in the inlet portion 42. In the preferred embodiment, an inlet portion diameter 52 is approximately two inches. The parameters of the inlet portion 42 define an inlet critical air flow rate 54 (in combination with other environmental factors and properties of the particular granular material 14). The inlet critical air flow rate 54 is the minimum flow rate required to motivate granular material 14 in the inlet portion 42. In the example embodiment, the inlet critical air flow rate is approximately three and one-half feet per second. This relatively low flow rate is preferred for dense phase transport of the granular material 14.

In operation, once the supplied pneumatic flow rate reaches the inlet critical air flow rate 54, the granular material 14 in the inlet portion 42 will flow downstream in the direction of travel 50 in the inlet portion 42 toward the transition portion 44. The transition cross sectional area 51 at the transition portion 44 is greater than the inlet cross sectional area 49 in the inlet portion 42. As a result, the transition portion critical air flow rate 56 is greater than the inlet critical air flow rate 54. Without the requisite orientation of the branch 30, the granular material 14 would not be motivated any further downstream because the expanded area at the transition portion 44 would reduce the velocity of the supplied air. To overcome this, the branch 30 is configured such that the granular material 14 is urged by gravity at least through the transition portion 44 (i.e., the portion of increased cross section relative to the inlet portion 42) to the outlet portions 46a, 46b, whereat the supplied pneumatic flow would again motivate the granular material 14 because the outlet critical air flow rate 78a, 78b is substantially equal to the inlet critical air flow rate 54. One skilled in the art will appreciate that other flow losses must be accounted for to ensure that the flow rate is sufficient throughout the branch 30, supply line 20, and distribution lines 34a, 34b, 34c, 34d to account for traditional flow losses and thus ultimately motivate the granular material 14 through the dense phase distribution system 10.

With continued reference to FIG. 3, the orientation of the branch 30 must be such that gravity urges the granular material 14 downstream through the transition portion 44. The orientation must take into consideration inherent properties of the granular material 14. Specifically, an angle of repose 58 defined by a pile of granular material 14 establishes the transfer angle 60 measured relative to a vertical axis 62 extending normal to a horizontal plane 64. The angle of repose 58 is the angle defined by the material properties of the particular granular material 14. Specifically, the shape and friction between grains of the granular material 14 influence the angle of repose 58. As shown in FIG. 3, the angle of repose 58 can be approximated by piling the granular material 14 on the horizontal plane 64 such that a conical body 66 having a peak and a base is formed thereon. The angle of repose 58 is then measured as the angle between the horizontal plane 64 and the repose surface 68 of the granular material 14. The angle of repose 58 substantially defines the minimum angle at which the particular granular material 14 will flow urged only by the force of gravity acting on the grains within the granular material 14. As shown in FIG. 3, the transfer angle 60 is fixed by the repose angle 58 and is defined between the repose surface 68 and the vertical axis 62.

To ensure gravity flow of the granular material 14 through the transition portion 44, the branch 30 must be oriented accordingly. The transition portion 44 defines multiple transition axes 70a, 70b extending along respective directions of travel 72a, 72b through the transition portion 44 and the outlet portions 46a, 46b, respectively. The transition axes 70a, 70b define transition angles 74a, 74b that must be equal to or, preferably, less than the transfer angle 60 defined by the granular material 14. If the transition angles 74a, 74b are equal to or less than the transfer angle 60, gravity will act to urge the granular material from the inlet portion 42 through the transition portion 44 and into the outlet portions 46a, 46b whereat the air supply will continue to motivate the granular material 14.

In the preferred example embodiment the outlet critical air flow rates 78a, 78b are substantially equal to the inlet critical air flow rate 54. Thus, given that only one of the outlet portions 46a, 46b is delivering the granular material 14 at a given moment (else additional air is required) the granular material 14 continues to flow downstream through the active outlet portion 46a, 46b.

In the preferred example embodiment, the outlet portions 46a, 46b define substantially circular cross-sections 80a, 80b in outlet planes 82a, 82b, respectively normal to the direction of travel of the granular material 14 in the outlet portions 46a, 46b. Additionally, respective outlet portion diameters 84a, 84b are preferably two inches. The outlet portions 46a, 46b direct the granular material 14 downstream to the branch outlets 32a, 32b and ultimately into the respective secondary containment systems 40a, 40b. Moreover, it is desirable to maintain a constant cross-sectional area as much as practical in the branch 30. The preferred embodiment includes external bends 86 that have a curvature matched to the appropriate internal bend 88. As a result, the cross-sectional area at a bend or curve remains substantially uniform.

The configuration of the branch 30 aids the flow of the granular material 14 in the dense phase distribution system 10. The structure of the branch 30 typically results in an increase in the flow area of the dense phase distribution system 10. This increase in area also results in a decrease of the pneumatic velocity and thus motivation of the granular material 14 through the branch 30. As a result, in prior systems, dense phase flow of granular material 14 required significantly higher pressures to motivate the granular material 14 through a branch 30. Moreover, significant pressure was necessary to ensure that the granular material 14 flowed through the branch 30 after a stoppage or deactivation of the dense phase supply system 12. Reactivating the dense phase supply system 12 after the granular material 14 has stagnated requires additional pressure due to the resistance within the granular material 14 and between the granular material 14 and the interior surfaces of the branch 30.

To overcome these, and other, inherent challenges in efficiently motivating granular material 14 in a dense phase distribution system 10, the branch 30 is generally oriented such that applying an amount of air to the inlet portion substantially equal to the inlet critical air flow rate 54 will result in the granular material 14 flowing through the transition portion 44 and into the downstream outlet portions 46a, 46b. The urging of gravity will help motivate the granular material 14 through the enlarged portion of the branch 30, thus reducing the air required to move the granular material 14 through the branch 30.

As one exemplary embodiment of the invention, the granular material 14 may include seed having an angle of repose 58 that is approximately thirty degrees. The transition angles 74a, 74b are preferably substantially between zero degrees and sixty degrees relative to the vertical axis 62. The branches 30 are oriented such that granular material 14 efficiently flows through the branch 30 with a minimal air supply.

As another exemplary embodiment of the invention, the granular material 14 may include fertilizer having an angle of repose 58 that is approximately thirty-eight degrees. In this situation, the transition angles 74a, 74b are preferably substantially between zero degrees and fifty-two degrees relative to the vertical axis 62 to ensure that the branches 30 are oriented such that granular material 14 efficiently flows through the branch 30 with a minimal air supply.

Figure 4:
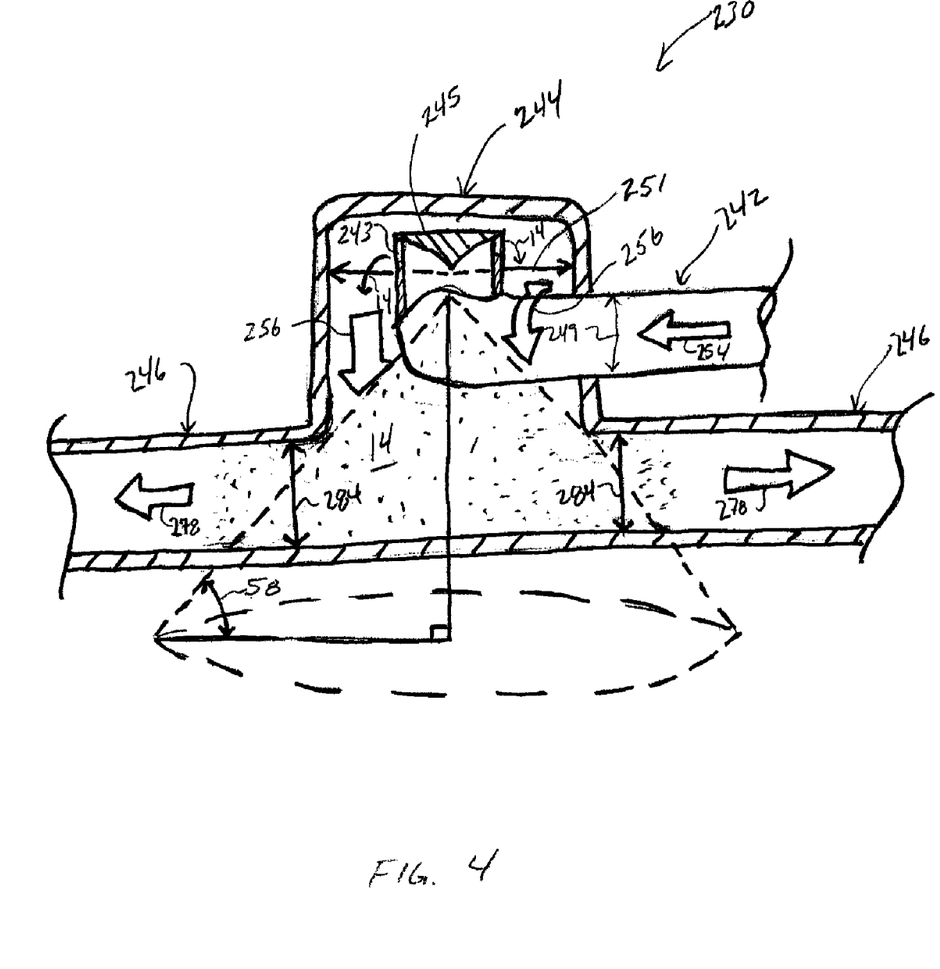
FIG. 4 is a partial section view of a branch in accordance with another aspect of the invention.

With additional reference to FIG. 4, after the angle of repose 58 has been determined, in any manner known to one skilled in the art, the branch 30 may be oriented in a variety of positions. As shown in FIG. 4, an alternative branch 230 is generally described. An inlet portion 242 defines an inlet critical air flow rate 254. The granular material 14 is directed in to a transition portion 244 having a transition critical air flow rate 256 that is greater than the inlet critical air flow rate 254 because the transition cross-sectional area 251 is greater than the inlet cross-sectional area 249. Again, the circular cross-section is not limiting, but merely used as an example. In operation, the granular material is directed out of the inlet portion 242 through a generally annular opening 243 defined by an arcuate plug 245. The plug 245 is secured proximate the end of the inlet portion 242 and establishes an opening 243 having a total area that is small enough to ensure that the inlet critical flow rate 254 is sufficient to motivate the granular material 14 fully into the transition portion 244. Alternatively, the plug 245 may be absent and a sufficient amount of air supplied to ensure that the granular material 14 piles atop the end of the inlet portion 242 and is shed into the transition portion 244. Once the granular material 14 moves into the transition portion 244, it naturally piles in accordance with the angle of repose 58 (shown in FIG. 4). However, the branch 230 is configured such that the urging of gravity on the granular material 14 motivates the granular material 14 into the outlet portions 246. Once the granular material 14 enters the outlet portions 246, the outlet portion diameter 284 results in an outlet critical air flow rate 278 substantially equal to the inlet critical air flow rate 254, thus the granular material 14 continues to flow through the branch 230 without the need for additional pneumatic motivation. The configuration shown in FIG. 4 is another example embodiment contemplated as within the scope of the invention. One skilled in the art will appreciate the variety of branch configurations given the teachings of the present disclosure.

Figure 5:
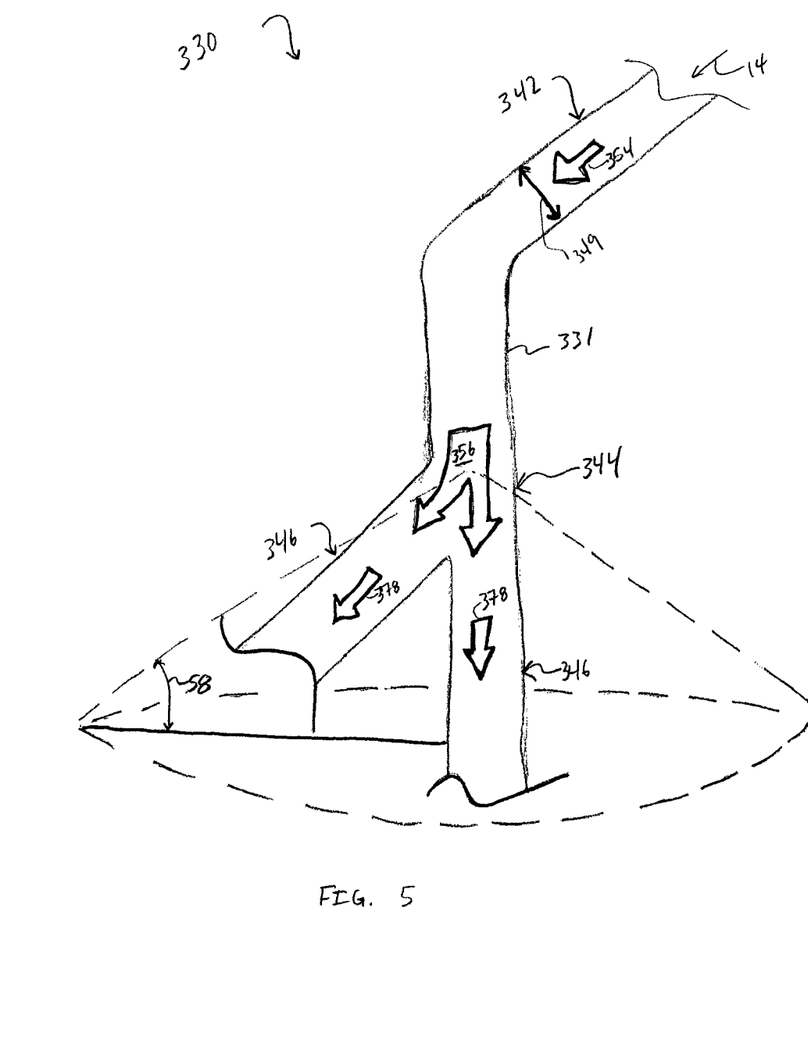
FIG. 5 is a partial side elevation view of a branch in accordance with yet a further aspect of the invention.

An additional example embodiment is shown in FIG. 5. An inlet portion 342 defines an inlet critical air flow rate 354. The granular material 14 is directed in to a transition portion 344 having a transition critical air flow rate 356 that is greater than the inlet critical air flow rate 354 because the transition cross-sectional area proximate the transition portion 344 is greater than the inlet cross-sectional area 349. This embodiment shows that the branch 330 may include a non-horizontal inlet portion 342 and an elongated vertical segment 331. In any event, the branch 330 is configured such that the urging of gravity on the granular material 14 motivates the granular material 14 into the outlet portions 346. The granular material 14 enters the outlet portions 346 where the outlet critical air flow rate 378 is substantially equal to the inlet critical air flow rate 354, thus the granular material 14 continues to flow through the branch 330 without the need for additional pneumatic motivation. The configuration shown in FIG. 5 is yet a further example embodiment contemplated as within the scope of the invention. Again, one skilled in the art will appreciate the variety of branch configurations given the teachings of the present disclosure.

Several example embodiments of the invention have been described in considerable detail. Many modifications and variations to the example embodiments described will be apparent to a person of ordinary skill in the art. Therefore, the invention should not be limited to the preferred example embodiments described.

I claim:

1. A branch configurable for use in a dense phase distribution system that distributes a granular material, comprising:
an inlet portion defining an inlet critical air flow rate required to cause the granular material to flow through the inlet portion;
a transition portion downstream of the inlet portion defining a transition critical air flow rate required to cause the granular material to flow through the transition portion; and
an outlet portion downstream of the transition portion;
wherein the transition critical air flow rate is greater than the inlet critical air flow rate; and
wherein the inlet portion is oriented relative to the outlet portion such that applying an amount of air to the inlet portion substantially equal to the inlet critical air flow rate will result in granular material moving through the transition portion and into the outlet portion.

2. The branch of claim 1, wherein:
the outlet portion defines an outlet critical air flow rate required to cause the granular material to flow through the outlet portion; and
the inlet critical air flow rate is substantially equal to the outlet critical air flow rate.

3. The branch of claim 1, wherein:
the inlet portion is substantially circular in an inlet plane normal to a direction of travel of the granular material in the inlet portion; and
the outlet portion is substantially circular in an outlet plane normal to a direction of travel of the granular material in the outlet portion.

4. The branch of claim 3, wherein:
the inlet portion defines an inlet portion diameter that is approximately two inches; and
the outlet portion defines an outlet portion diameter that is approximately two inches.

5. The branch of claim 1, wherein the inlet critical air flow rate is less than approximately 3.5 feet per second.

6. The branch of claim 1, further comprising:
a vertical axis extending normal to a horizontal plane;
a transition axis defined by the transition portion along a direction of travel and intersecting the vertical axis;
a transition angle defined between the vertical axis and the transition axis; and
a transfer angle defined between the vertical axis and an inherent repose surface defined by the granular material;
wherein the transition angle is equal to or less than the transfer angle.

7. A branch configurable for use in a dense phase distribution system that distributes a granular material defining a transfer angle between a vertical axis and an inherent repose surface defined by the granular material, comprising:
an inlet portion defining an inlet critical air flow rate required to cause the granular material to flow through the inlet portion;
a transition portion downstream of the inlet portion defining a transition axis along a direction of travel in the transition portion and intersecting the vertical axis, a transition angle defined between the vertical axis and the transition axis, and a transition critical air flow rate required to cause the granular material to flow through the transition portion; and
an outlet portion downstream of the transition portion;
wherein the transition critical air flow rate is greater than the inlet critical air flow rate; and
wherein the transition angle is equal to or less than the transfer angle such that a force of gravity urges the granular material from the inlet portion through the transition portion and into the outlet portion.

8. The branch of claim 7, wherein:
the outlet portion defines an outlet critical air flow rate required to cause the granular material to flow through the outlet portion; and the inlet critical air flow rate is substantially equal to the outlet critical air flow rate.

9. The branch of claim 7, wherein:
the inlet portion is substantially circular in an inlet plane normal to a direction of travel of the granular material in the inlet portion; and
the outlet portion is substantially circular in an outlet plane normal to a direction of travel of the granular material in the outlet portion.

10. The branch of claim 9, wherein:
the inlet portion defines an inlet portion diameter that is approximately two inches; and
the outlet portion defines an outlet portion diameter that is approximately two inches.

11. The branch of claim 7, wherein the inlet critical air flow rate is less than approximately 3.5 feet per second.

12. A method of manufacturing a branch for use in a dense phase distribution system that distributes a granular material along a direction of travel, comprising the steps of:
arranging an inlet portion that defines an inlet critical air flow rate required to cause the granular material to flow through the inlet portion;
arranging a transition portion downstream of the inlet portion that defines a transition critical air flow rate required to cause the granular material to flow through the inlet portion, wherein the transition critical air flow rate is greater than the inlet critical air flow rate;
arranging an outlet portion downstream of the transition portion; and
orienting the inlet portion relative to the outlet portion such that applying an amount of air to the inlet portion substantially equal to the inlet critical air flow rate will result in granular material moving through the transition portion and into the outlet portion.

13. The method of manufacturing a branch of claim 12, wherein:

the outlet portion defines an outlet critical air flow rate required to cause the granular material to flow through the outlet portion; and the inlet critical air flow rate is substantially equal to the outlet critical air flow rate.

* * * * *